US010558935B2

(12) United States Patent
Abu-Mostafa et al.

(10) Patent No.: US 10,558,935 B2
(45) Date of Patent: Feb. 11, 2020

(54) WEIGHT BENEFIT EVALUATOR FOR TRAINING DATA

(71) Applicant: CALIFORNIA INSTITUTE OF TECHNOLOGY, Pasadena, CA (US)

(72) Inventors: Yaser Said Abu-Mostafa, Pasadena, CA (US); Carlos Roberto Gonzalez, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 14/451,859

(22) Filed: Aug. 5, 2014

(65) Prior Publication Data

US 2015/0206065 A1    Jul. 23, 2015

Related U.S. Application Data

(60) Provisional application No. 62/015,133, filed on Jun. 20, 2014, provisional application No. 61/907,504, filed on Nov. 22, 2013.

(51) Int. Cl.
G06N 99/00    (2010.01)

(52) U.S. Cl.
CPC ................. *G06N 99/005* (2013.01)

(58) Field of Classification Search
CPC ..... G06N 20/00; G06K 9/6256; G06K 9/6228
See application file for complete search history.

(56) References Cited

U.S. PATENT DOCUMENTS 5,819,247 A * 10/1998 Freund ................. G06K 9/6256
706/25
6,119,083 A    9/2000 Hollier et al.
(Continued)

FOREIGN PATENT DOCUMENTS

EP    1082646 B1    8/2011
EP    2296105 B1    10/2012
(Continued)

OTHER PUBLICATIONS

Bickel et al., "Discriminative Learning Under Covariate Shift," Journal of Machine Learning Research 10 (2009) 2137-2155, 2009.*
(Continued)

*Primary Examiner* — Alexey Shmatov
*Assistant Examiner* — Oluwatosin O Alabi

(57) ABSTRACT

Technologies are generally described for methods and systems effective to determine a weight benefit associated with application of weights to training data in a machine learning environment. In an example, a device may determine a first function based on the training data, where the training data includes training inputs and training labels. The device may determine a second function based on weighted training data, which is based on application of weights to the training data. The device may determine a third function based on target data, where the target data is generated based on a target function. The target data may include target labels different from the training labels. The device may determine a fourth function based on weighted target data, which is a result of application of weights to the target data. The device may determine the weight benefit based on the first, second, third, and fourth functions.

16 Claims, 6 Drawing Sheets

(56) References Cited

U.S. PATENT DOCUMENTS

| | | | |
|---|---|---|---|
| 6,373,483 B1 | 4/2002 | Becker et al. | |
| 6,453,307 B1 | 9/2002 | Schapire et al. | |
| 6,594,586 B1* | 7/2003 | Song | G01N 33/56972 382/133 |
| 6,789,069 B1* | 9/2004 | Barnhill | G06F 19/24 706/12 |
| 6,850,873 B1 | 2/2005 | Bax | |
| 6,876,955 B1 | 4/2005 | Fleming et al. | |
| 7,275,018 B2 | 9/2007 | Abu-El-Zeet et al. | |
| 7,379,568 B2 | 5/2008 | Movellan et al. | |
| 7,426,497 B2* | 9/2008 | Bacioiu | G06K 9/6262 706/12 |
| 7,561,158 B2 | 7/2009 | Abe et al. | |
| 7,617,164 B2* | 11/2009 | Burges | G06N 99/005 706/15 |
| 7,689,520 B2* | 3/2010 | Burges | G06F 17/30864 706/12 |
| 7,720,830 B2* | 5/2010 | Wen | G06F 17/3089 707/705 |
| 8,175,384 B1 | 5/2012 | Wang | |
| 8,386,401 B2* | 2/2013 | Virkar | G06N 3/02 706/12 |
| 8,788,439 B2* | 7/2014 | Martinez | G06N 3/0454 706/12 |
| 8,798,984 B2* | 8/2014 | Cancedda | G06F 17/2818 704/2 |
| 2002/0107842 A1 | 8/2002 | Biebesheimer et al. | |
| 2005/0071301 A1* | 3/2005 | Kuroiwa | G06N 99/005 706/12 |
| 2005/0216426 A1* | 9/2005 | Weston | G06K 9/6215 706/12 |
| 2005/0228783 A1* | 10/2005 | Shanahan | G06F 17/3069 |
| 2006/0143254 A1 | 6/2006 | Chen | |
| 2006/0248049 A1* | 11/2006 | Cao | G06F 17/30654 |
| 2007/0094171 A1* | 4/2007 | Burges | G06N 3/08 706/16 |
| 2007/0203908 A1* | 8/2007 | Wang | G06F 17/30657 |
| 2007/0203940 A1* | 8/2007 | Wang | G06F 17/30864 |
| 2007/0223808 A1 | 9/2007 | Kerr | |
| 2008/0169975 A1 | 7/2008 | Yee | |
| 2009/0091443 A1 | 4/2009 | Chen | |
| 2009/0132515 A1* | 5/2009 | Lu | G06F 17/30699 |
| 2010/0169243 A1* | 7/2010 | Su | G06N 99/005 706/12 |
| 2010/0287125 A1 | 11/2010 | Okubo | |
| 2011/0119213 A1 | 5/2011 | Elisseeff et al. | |
| 2012/0078825 A1* | 3/2012 | Kulkarni | G06F 17/30864 706/12 |
| 2012/0223889 A1* | 9/2012 | Medlock | G06F 3/04883 345/168 |
| 2012/0271821 A1 | 10/2012 | Qin et al. | |
| 2012/0290316 A1 | 11/2012 | Tidhar | |
| 2012/0290319 A1* | 11/2012 | Saria | G06Q 50/24 705/3 |
| 2012/0330971 A1* | 12/2012 | Thomas | G06F 17/30663 707/748 |
| 2013/0066452 A1 | 3/2013 | Kobayashi et al. | |
| 2013/0097103 A1 | 4/2013 | Chari et al. | |
| 2013/0118736 A1 | 5/2013 | Usadi | |
| 2013/0238533 A1 | 9/2013 | Virkar | |
| 2013/0254153 A1 | 9/2013 | Marcheret | |
| 2014/0079297 A1* | 3/2014 | Tadayon | G06K 9/00 382/118 |
| 2014/0180738 A1 | 6/2014 | Phillipps et al. | |
| 2014/0180980 A1* | 6/2014 | Hido | G06N 99/005 706/12 |
| 2014/0195466 A1 | 7/2014 | Phillipps et al. | |
| 2014/0201126 A1* | 7/2014 | Zadeh | G06K 9/627 706/52 |
| 2015/0019463 A1 | 1/2015 | Simard et al. | |
| 2015/0100530 A1 | 4/2015 | Mnih et al. | |
| 2015/0206065 A1* | 7/2015 | Abu-Mostafa | G06N 99/005 706/12 |
| 2015/0206066 A1* | 7/2015 | Abu-Mostafa | G06K 9/6223 706/12 |
| 2015/0206067 A1* | 7/2015 | Abu-Mostafa | G06N 99/005 706/12 |
| 2015/0254573 A1* | 9/2015 | Abu-Mostafa | G06N 99/005 706/12 |
| 2016/0162802 A1 | 6/2016 | Chickering et al. | |
| 2016/0379140 A1 | 12/2016 | Abu-Mostafa et al. | |
| 2017/0011307 A1 | 1/2017 | Abu-Mostafa et al. | |

FOREIGN PATENT DOCUMENTS

| | | | |
|---|---|---|---|
| JP | 2005044330 A | 2/2005 | |
| JP | 2010092266 A | 4/2010 | |
| WO | 03040949 A1 | 5/2003 | |
| WO | 2014151351 A1 | 9/2014 | |
| WO | WO 2014151351 A1 * | 9/2014 | G06F 17/30867 |
| WO | 2015077555 A2 | 5/2015 | |
| WO | 2015077557 A1 | 5/2015 | |
| WO | 2015077564 A2 | 5/2015 | |
| WO | WO 2015077555 A2 * | 5/2015 | G06N 99/005 |
| WO | WO 2015077557 A1 * | 5/2015 | G06N 99/005 |
| WO | WO 2015077564 A2 * | 5/2015 | G06K 9/6228 |

OTHER PUBLICATIONS

Liu, et al. "A Robust Support Vector Data Description Classifier," Proceedings of the 32th Chinese Control Conference, pp. 1-4, Xi'an, China, Jul. 26-28, 2013.*

Gonzalez, C.R., and Abu-Mostafa, Y.S., "Four Results in Matching Data Distributions," pp. 1-18 (Jun. 21, 2014).*

Gonzalez, C.R., and Abu-Mostafa, Y.S., "Mismatched Training and Test Distributions Can Outperform Matched Ones," Neural Computation, vol. 27, No. 2, pp. 365-387 (Feb. 2015).*

Mason, L., et al., "Boosting Algorithms as Gradient Descent," Advances in Neural Information Processing Systems, vol. 12, pp. 512-518 (1999).*

Sugiyama, M., et al., "Covariate Shift Adaptation by Importance Weighted Cross Validation," Journal of Machine c Learning Research, vol. 8, pp. 985-1005 (2007).*

Mehrotra et al., "Fault Tolerance of Neural Networks," Final Technical Report, RL-TR-94-93, Syracuse University, July 1994.*

Silva et al., "Data classification with multilayer perceptrons using a generalized error function," Neural Networks 21 (2008), 1302-1310.*

Mehrotra et al., "Fault Tolerance of Neural Networks," Final Technical Report, RL-TR-94-93, 107 pp., Syracuse University, Jul. 1994.*

Fortin, V., Favre, A. C., & Saïd, M. (2006). Probabilistic forecasting from ensemble prediction systems: Improving upon the best-member method by using a different weight and dressing kernel for each member. Quarterly Journal of the Royal Meteorological Society, 132(617), 1349-1369. (Year: 2006).*

International Search Report and Written Opinion for application PCT/US15/15669, dated Jun. 3, 2015, 15 pages.

International Search Report and Written Opinion for application PCT/US2014/066808, dated Feb. 24, 2015, 15 pages.

International Search Report and Written Opinion for international application PCT/US2014/066805, dated Feb. 19, 2015, 10 pages.

"AdaBoost", AdaBoost—Wikipedia, the free encyclopedia, accessed at http://en.wikipedia.org/wiki/AdaBoost, Last modified on Mar. 26, 2014, 8 Pages.

"Machine learning: Boosting," accessed at http://math.bu.edu/people/mkon/MA751/L17Boosting.pdf, accessed on Jun. 16, 2014, pp. 41.

Bickel, S., et al., "Discriminative Learning under covariate shift," The Journal of Machine Learning Research, 2009, pp. 2137-2155, vol. 10.

Bickel, S., et al., "Discriminative Learning for Differing Training and Test Distributions," In Proceedings of the 24th international conference on Machine learning, 2007, pp. 81-88.

Cao, B., et al., "Distance Metric Learning under Covariate Shift," Proceedings of the Twenty-Second International Joint Conference on Artificial Intelligence, 2011, pp. 1204-1210.

(56) References Cited

OTHER PUBLICATIONS

Chen, T., et al., "Feature-Based Matrix Factorization," 2011, pp. 10.
Cortes, C., et al., "Sample Selection Bias Correction Theory," In Algorithmic Learning Theory, 2008, pp. 38-53.
Cortes, C., et al., "Learning Bounds for Importance Weighting," Advances in Neural Information Processing Systems, 2010, pp. 442-450.
Hanczar, B. and Dougherty, E., "The reliability of estimated confidence intervals for classification error rates when only a single sample is available," Pattern Recognition, 2013, pp. 1067-1077, vol. 46.
Huang, J., et al., "Correcting Sample Selection Bias by Unlabeled Data," Proceedings of the 2006 Conference Advances in Neural Information processing systems, 2007, pp. 601-608, vol. 19.
Kohavi, R., et al., "The Utility of Feature Weighting in Nearest-Neighbor Algorithms," Proceedings of the Ninth European Conference on Machine Learning, 1997, pp. 10.
Koren, Y., "Factorization meets the neighborhood: a multifaceted collaborative filtering model," In Proceedings of the 14th ACM SIGKDD international conference on Knowledge discovery and data mining, 2008, pp. 426-434, ACM.
Rajan, S., "A Large-Scale Active Learning System for Topical Categorization on the Web," Proceedings of the 19th international conference on World wide web, 2010, pp. 791-800.
Ren, J., et al., "Type Independent Correction of Sample Selection Bias via Structural Discovery and Re-balancing," In Proceedings of the Eighth SIAM International Conference on Data Mining, 2008, pp. 565-576.
Rosset, S., et al., "A Method for Inferring Label Sampling Mechanisms in Semi-Supervised Learning," Advances in Neural Information Processing Systems 17, 2005, pp. 8.
Shimodaira, H., "Improving predictive inference under covariate shift by weighting the log-likelihood function," Journal of Statistical Planning and Inference, 2000, pp. 227-244, vol. 90.
Sugiyama, M., "Direct Importance Estimation with Model Selection and Its Application to Covariate Shift Adaptation," Advances in neural information processing systems, 2008, pp. 1433-1440.
Tsianos, K. I., et al., "Push-Sum Distributed Dual Averaging for Convex Optimization," In proceeding of IEEE Conference on Decision and Control, 2012, pp. 5453-5458.
Zadrozny, B., "Learning and Evaluating Classifiers under Sample Selection Bias," In Proceedings of the 21st international conference on Machine learning, 2004, pp. 1-8.
Zadrozny, B., et al., "Cost-Sensitive Learning by Cost-Proportionate Example Weighting," Proceedings of the Third IEEE International Conference on Data Mining, 2003, pp. 435-442.
"Machine learning," accessed at https://web.archive.org/web/20141117095534/http://en.wikipedia.org/wiki/Machine_learning, last modified on Nov. 16, 2014, pp. 13.
Sugiyama, M., et al., "Covariate Shift Adaptation by Importance Weighted Cross Validation," Journal of Machine Learning Research, vol. 8, pp. 985-1005 (2007).
International Search Report and Written Opinion for International application PCT/US2014/066816, dated Feb. 19, 2015, pp. 11.
Liu, F., et al., "A Robust Support Vector Data Description Classifier," Proceedings of the 32nd Chinese Control Conference, pp. 3781-3784, (Jul. 26-28, 2013).
Babenko, B., "Note: A Derivation of Discrete AdaBoost", Department of Computer Science and Engineering, University of California, San Diego, available at https://web.archive.org/web/20110717111635/http://vision.ucsd.edu/~bbabenko/data/boosting_note.pdf, Jul. 17, 2011, 3 pages.
Bylander, T. and Tate, L. "Using Validation Sets to Avoid Overfitting in AdaBoost," Department of Computer Science, University of Texas at San Antonio, pp. 544-549 (2006).
Extended european search Report for Application No. 16172168.3, dated Nov. 25, 2016, 12 pages.
Gonzalez, C, R., "Optimal Data Distributions in Machine Learning", California Institute of Technology, pp. 125 (May 22, 2015).
Kalai, A.T. et al.,"Boosting in the presence of noise" Proceedings of the thirty-fifth annual ACM symposium on Theory of computing, pp. 10, (Jun. 9, 2013).
Rockafellar, R.T., "Basic Issues in Lagrangian Optimization," Department of Applied Mathematics University of Washington FS—20 Seattle, WA 98195, USA, pp. 25 (1993).
Vanck, T., et al., "Using Hyperbolic Cross Approximation to measure and compensate Covariate Shift,"Workshop and Conference Proceedings 29, pp. 435-450 (2013).
"Cross-validation (statistics)," Wikipedia, accessed at https://web.archive.org/web/20131115062828/https://en.wikipedia.org/wiki/Cross-validation_(statistics), modified on Nov. 14, 2013, pp. 6.
Bickel, S., et al., "Discriminative Learning for Differing Training and Test Distributions," Proceedings of the 24th International Conference on Machine Learning, pp. 8 (Jun. 24, 2007).
Bickel, S., et al., "Learning under Differing Training and Test Distributions," Dissertation, Universifat Potsdam, pp. 110 (Jul. 22, 2009).
Chiu., H.P., et al., "Learning to generate novel views of objects for class recognition," Computer Vision and Image Understanding, vol. 113, pp. 1183-1197 (2009).
Extended European Search Report for Application No. 14864007.1, dated Jul. 6, 2017, pp. 15.
Extended European Search Report for Application No. 14864908.0, dated Jul. 5, 2017, pp. 5.
Gretton, A., et al., "Covariate Shift by Kernel Mean Matching," in Dataset Shift in Machine Learning, Chapter 8, Quinonero-Candela, J., et al., eds., MIT Press (Dec. 12, 2008).
Guo., Y., et al., "A Reformulation of Support Vector Machines for General Confidence Functions," Advances in Machine Learning, pp. 109-119 (Nov. 2009).
Hachiya., H., et al., "Importance-Weighted Least-Squares Probabilistic Classifier for Covariate Shift Adaptation with Application to Human Activity Recognition," Neurocomputing, vol. 80, pp. 93-101 (Mar. 15, 2012).
Sakurada, R., et al., "Stock Return Prediction Using Messages of the Internet Forum," Department of Computer Science and Engineering. Toyohashi University of Technology, pp. 7 (May 31, 2013) (English Abstract).
Sugiyama, M., et al., "Supervised Learning under Non-Stationarity: when input distribution of data changes," Japan Indutrial Publishing Co., Ltd, vol. 18, No. 10, pp. 1-6 (Oct. 1, 2007) (English Abstract).
Extended European Search Report for European Application No. 14863709.3, dated Jul. 6, 2017, pp. 13.
Extended European Search Report for European Application No. 15761177.3, dated Aug. 30, 2017, pp. 10.
Biskup, "Newton's Method and Gradient Descent Method,", <www.math.ucla.edu/-biskup/164.2.14f/PDFs/recusions.pdf>, Course Notes for Math 164-2, Fall 2014, Nov. 3, 2014, 4 pp.
Bootkrajang, et al., "Boosting in the presence of label noise", arXiv preprint arXiv: 1309.6818, 2013, 10 pages.
Johns, "Importance Sampling for Bootstrap Confidence Interval", Journal of the American Statistical Association, vol. 83, No. 403, Sep. 1988, pp. 709-714.
Sugiyama, "Active learning in approximately linear regression based on conditional expectation of generalization error", Journal of Machine Learning Research, vol. 07, Jan. 12, 2006, pp. 141-166.
Vafeiadis, et al., "A comparison of machine learning techniques for customer chum prediction", Simulation Modelling Practice and Theory, vol. 55, 2015, 1-9 pages.

\* cited by examiner

500 A computer program product.

502 A signal bearing medium.

504

At least one of

One or more instructions for determining a weight benefit associated with training data in a machine learning environment; or One or more instructions for determining a first function based on the training data, wherein the training data includes training inputs and training labels; or One or more instructions for applying a set of weights to the training data to generate weighted training data; or One or more instructions for determining a second function based on the weighted training data; or One or more instructions for generating target data based on a target function, wherein the target data includes target labels different from the training labels; or One or more instructions for determining a third function based on the target data; or One or more instructions for applying the set of weights to the target data to generate weighted target data; or One or more instructions for determining a fourth function based on weighted target data; or One or more instructions for determining the weight benefit based on the first, second, third, and fourth functions, wherein the weight benefit is associated with a benefit to apply the set of weights to the training data.

506 A computer-readable medium

508 A recordable medium

510 A communications medium

Fig. 5

WEIGHT BENEFIT EVALUATOR FOR TRAINING DATA

CROSS-REFERENCE TO RELATED APPLICATIONS

This application is related to U.S. application Ser. No. 14/451,870 entitled "Generation of Weights in Machine Learning", U.S. application Ser. No. 14/451,899 entitled "Weight Generation in Machine Learning", and U.S. application Ser. No. 14/451,935 entitled "Alternative Training Distribution Data in Machine Learning".

This application claims priority under 35 U.S.C. § 119(e) to U.S. Provisional Application Ser. No. 62/015,133 entitled "Weight Benefit Evaluator for Training Data", filed on Jun. 20, 2014, and U.S. Provisional Application Ser. No. 61/907,504 entitled "To Weight or not to Weight in a Learning Scenario with Unmatched Distributions", filed on Nov. 22, 2013, the entirety of both of these provisional applications is hereby incorporated by reference.

BACKGROUND

In machine learning environments, training data, including training inputs and training labels, may be used to determine a learned function. The learned function may be effective to indicate a relationship between the training inputs and training labels. The learned function may be deployed in a machine learning system. The machine learning system may receive test inputs and may apply the learned function to the test inputs to produce test labels, where the test inputs and the test labels may be formed into test data.

SUMMARY

In some examples, methods to determine a weight benefit associated with training data in a machine learning environment are generally described. The methods may include determining, by a device, a first function based on the training data, wherein the training data may include training inputs and training labels. The methods may also include applying, by the device, a set of weights to the training data to generate weighted training data. The methods may also include determining, by the device, a second function based on the weighted training data. The methods may also include generating, by the device, target data based on a target function. The target data may include target labels different from the training labels. The methods may also include determining, by the device, a third function based on the target data. The methods may also include applying, by the device, the set of weights to the target data to generate weighted target data. The methods may also include determining, by the device, a fourth function based on weighted target data. The methods may also include determining, by the device, the weight benefit based on the first, second, third, and fourth functions. The weight benefit may be associated with a benefit to apply the set of weights to the training data.

In some examples, systems effective to determine a weight benefit associated with training data in a machine learning environment are generally described. The systems may include a memory. The memory may be configured to store the training data. The training data may include training inputs and training labels. The memory may also be configured to store a set of weights. The systems may also include a target function generation module configured to be in communication with the memory. The target function generation module may be configured to generate target data based on a target function. The target data may include target labels different from the training labels. The target function generation module may also be configured to store the target data in the memory. The systems may also include a processing module configured to be in communication with the target function generation module and the memory. The processing module may be configured to apply the set of weights to the training data to generate weighted training data. The processing module may also be configured to apply the set of weights to the target data to generate weighted target data. The processing module may also be configured to store the weighted training data and the weighted target data in the memory. The systems may also include a machine learning module configured to be in communication with the target function generation module, the processing module, and the memory. The machine learning module may be configured to determine a first function based on the training data. The machine learning module may also be configured to determine a second function based on the weighted training data. The machine learning module may also be configured to determine a third function based on the target data. The machine learning module may also be configured to determine a fourth function based on weighted target data. The systems may also include an evaluation module configured to be in communication with the target function generation module, the processing module, the machine learning module, and the memory. The evaluation module may be configured to determine the weight benefit based on the first, second, third, and fourth functions. The weight benefit may be associated with a benefit to apply the set of weights to the training data.

In some examples, methods to determine a weight benefit associated with training data in a machine learning environment are generally described. The methods may include receiving, by a first device, a first function from a second device. The first function may be based on the training data. The training data may include training inputs and training labels. The methods may also include receiving, by the first device, a set of weights from the second device. The methods may also include receiving, by the first device, a second function from the second device. The second function may be based on weighted training data. The weighted training data may be based on the set of weights. The methods may also include generating, by the first device, target data based on a target function. The target data may include target labels different from the training labels. The methods may also include determining, by the first device, a third function based on the target data. The methods may also include, applying, by the first device, the set of weights to the target data to generate weighted target data. The methods may also include determining, by the first device, a fourth function based on weighted target data. The methods may also include determining, by the first device, the weight benefit based on the first, second, third, and fourth functions. The weight benefit may be associated with a benefit to apply the set of weights to the training data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 illustrates an example computer program product that can be utilized to implement a weight benefit evaluator for training data.

Figure 1:
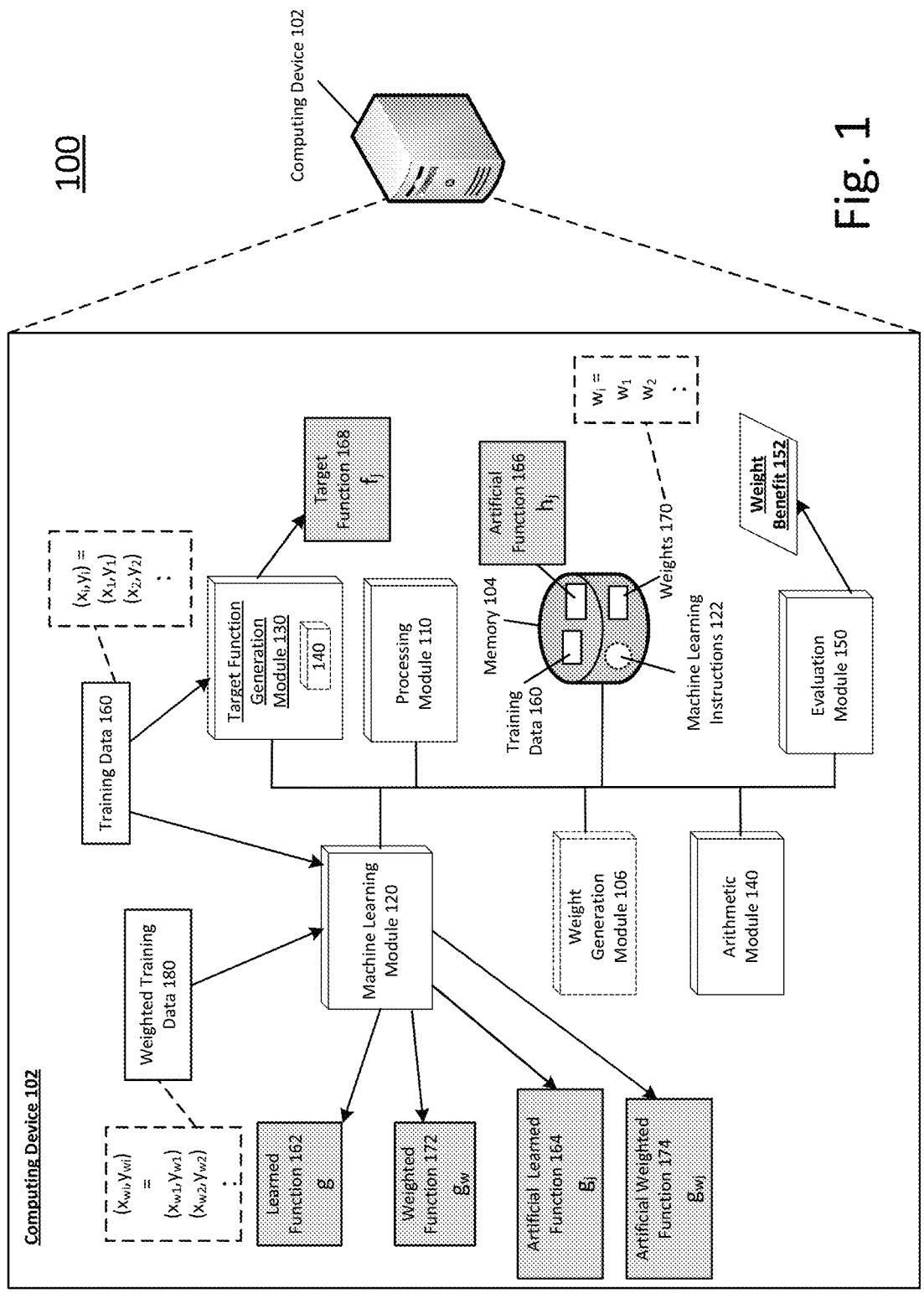
FIG. 1 illustrates an example system that can be utilized to implement a weight benefit evaluator for training data.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a weight benefit evaluator for training data.

Briefly stated, technologies are generally described for methods and systems effective to determine a weight benefit associated with an application of a set of weights to training data in a machine learning environment. For example, the weights may be used to cause some points in the training data to contribute more than other points resulting in generation of a different learned function. In an example, a device may determine a first function based on the training data, where the training data includes training inputs and training labels. For example, the training inputs may be a user profile (e.g., age, gender, income) and labels (e.g., a movie rating). The first function may be effective to indicate a relationship between the training inputs and the training labels. For example, the first function may indicate a relationship between a user profile and a movie rating. The device may determine a second function based on weighted training data, which is based on application of weights to the training data. A second function may be generated after weights are applied to the training data. Operation of the second function may be compared to the first function as discussed herein. The device may determine a third function based on target data, where the target data is generated based on a target function. The target function may be used to compare a function generated with weights and without weights. The target data may include target labels different from the training labels. The device may determine a fourth function based on weighted target data, which may be a result of application of weights to the target data. The device may determine the weight benefit based on the first, second, third, and fourth functions. For example, the device may determine whether the weight should be applied.

FIG. 1 illustrates an example system that can be utilized to implement a weight benefit evaluator for training data, arranged in accordance with at least some embodiments described herein. As will be described in more detail below, a system 100 may be implemented as a machine learning system. System 100 may be implemented to determine a learned function 162 (denoted as g) based on training data 160 (denoted as $(x_i, y_i)$). An example of training data 160 may be a user profile (e.g., age, gender, income) and labels (e.g., a movie rating). An example of a learned function 162 may be a function that receives as input a test user profile and generates as output a test movie rating. Training data 160 may be associated with a set of paired data including training inputs $(x_i)$ and training labels (denoted as $y_i$) at each point i. System 100 may be further implemented to determine a weighted function 172 (denoted as $g_w$) based on weighted training data 180 (denoted as $(x_{wi}, y_{wi})$). Weighted training data 180 may be a result of an application of a set of weights ("weights") 170 (denoted as $w_i$) to training data 160. Set of weights 170 may weigh certain points (including training inputs and training labels) in training data 160 more than other points different from the certain points in training data 160. For example, certain points may be given a higher weight and so may contribute more to the generation of weighted function 172. System 100 may be further implemented to determine a weight benefit 152, where weight benefit 152 may be associated with a benefit to apply set of weights 170 to training data 160.

In an example, system 100 may be implemented with computing device 102, where computing device 102 may be a computer or a server. Computing device 102 may include a processing module 110, a machine learning module 120, a target function generation module 130, an arithmetic module 140, and/or an evaluation module 150. Processing module 110, machine learning module 120, target function generation module 130, arithmetic module 140, and/or evaluation module 150 may be configured to be in communication with each other. Computing device 102 may further include a memory 104 configured to be in communication with processing module 110, machine learning module 120, target function generation module 130, arithmetic module 140, and/or evaluation module 150. In some examples, each module of computing device 102 may be a hardware component or an embedded system including integrated circuits such as FPGA (Field Programmable Gate Array), SoC (System on Chip), etc. In some examples, a first module may be embedded on a second module. For example, arithmetic module 140 may be embedded on target function generation module 130. In some examples, processing module 110, machine learning module 120, target function generation module 130, arithmetic module 140, and/or evaluation module 150 may be components of a processor of computing device 102.

Memory 104 may be configured to store machine learning instructions 122, at least one artificial function 166 (denoted as $h_j$), training data 160, and/or weights 170. Machine learning instructions 122 may include instructions effective to facilitate generation of learned functions such as learned function 162 and/or weighted function 172, etc. Machine learning instructions 122 may further include instructions associated with operations of target function generation module 130, arithmetic module 140, and/or evaluation module 150. In some examples, machine learning instructions 122 may be stored in machine learning module 120. Artificial function 166 may be a function which was previously generated by an implementation of system 100 as is described below.

Training data 160 may be associated with a set of paired data including training inputs ($x_i$) and training labels ($y_i$). Training inputs ($x_i$) may be a set of vectors, where each vector may correspond to one or more coordinates. Set of weights 170 may be a set of vectors which may be applied, such as by processing module 110, to training data 160. As a result of the application of weights 170 to training data 160, weighted training data 180 may be generated. Weighted training data 180 may be associated with a set of paired data including weighted training inputs ($x_{wi}$) and weighted training labels ($y_{wi}$). In some examples, set of weights 170 may be received at computing device 102 from another computing device. In some examples, computing device 102 may further include a weight generation module 106 configured to generate weights 170. In some examples, processing module 110 may be further configured to control operations of one or more modules in computing device 102 such as machine learning module 120, target function generation module 130, arithmetic module 140, and evaluation module 150. Processing module 110 may be further configured to receive weight benefit 152 from evaluation module 150, and in response, determine whether to apply weights 170 to training data 160. Weight benefit 152 may be binary data such as "apply" or "do not apply", or "0" and "1", or "A" and "not A", etc.

Target function generation module 130 may be configured to generate a target function 168 (denoted as $f_j$) with use of training data 160 and artificial function 166 (described below). In some examples, arithmetic module 140 may be configured to perform particular operations to facilitate generation of target function 168 by target function generation module 130. For example, arithmetic module 140 may be configured to perform complex computations such as comparison of large datasets during implementation of system 100.

Machine learning module 120 may be configured to determine learned function 162 based on training data 160. Determination of learned function 162 may include determining a relationship between training inputs ($x_i$) and training labels ($y_i$). Learned function 162 may be effective to indicate the relationship between training inputs ($x_i$) and training labels ($y_i$). Machine learning module 120 may be further configured to determine weighted function 172 based on weighted training data 180. Determination of weighted function 172 may include determining a relationship between weighted training inputs ($x_{wi}$) and weighted training labels ($y_{wi}$). Weighted function 172 may be effective to indicate the relationship between weighted training inputs ($x_{wi}$) and weighted training labels ($y_{wi}$). As will be described in more detail below, machine learning module 120 may be configured to determine an artificial learned function 164 (denoted as $g_j$) and an artificial weighted function 174 (denoted as $g_{wj}$) based on artificial function 166 and target function 168. Evaluation module 150 may determine weight benefit 152 based on learned function 162, weighted function 172, artificial learned function 164, and artificial weighted function 174.

Figure 2:
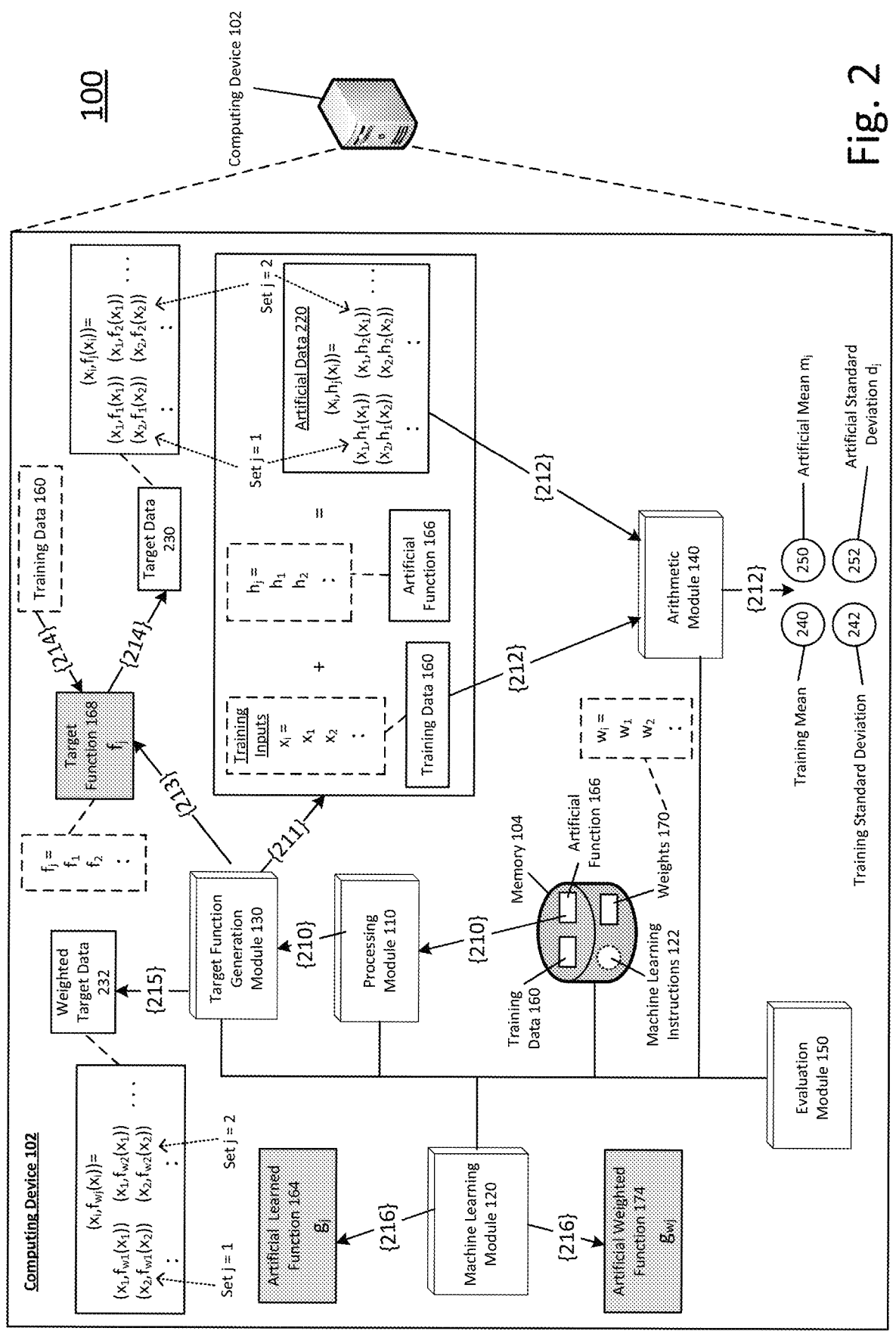
FIG. 2 illustrates the example system of FIG. 1 with additional detail relating to determination of an artificial learned function and an artificial weighted function.

FIG. 2 illustrates example system 100 of FIG. 1 with additional detail relating to determination of an artificial learned function and an artificial weighted function, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

As will be described in more detail below, target function generation module 130 may generate one or more target functions 168 based on training data 160 (in memory 104) and based on artificial function 166 (in memory 104) (described with reference to operations {210, 211, 212, 213}). After generation of target function 168, target function generation module 130 may generate target data 230 based on training data 160 and based on target function 168. Processing module 110 may apply weights 170 to target data 230 to generate weighted target data 232 (operations {214, 215}). Machine learning module 120 may determine artificial learned function 164 based on target data 230 (operation {216}). Machine learning module 120 may further determine artificial weighted function 174 based on weighted target data 232 (operation {216}).

At operation 210, target function generation module 130 may retrieve artificial function 166 from memory 104. In an example, processing module 110 may be configured to instruct target function generation module 130 to select a number of artificial functions 166 among more than one artificial functions stored in memory 104. Selection of artificial function 166 may be based on machine learning instructions 122. In an example, an output of machine learning instructions 122, and the final desired learned function, may be a function that follows a model represented by a polynomial of degree four, such as $ax^3+bx^2+cx+d$. Processing module 110 may randomly select a set of parameters, such as values for coefficients a, b, c, d, based on instructions in machine learning instructions 122. For a particular selection j, if processing module 110 selects a=1, b=3, c=7, d=12, then the $j^{th}$ artificial function 166 would be $x^3+3x^2+7x+12$.

After selection of the number of artificial functions 166, generation of target function 168 may continue from operation 210 to operation 211. At operation 211, target function generation module 130 may apply training inputs $x_i$ of training data 160 to the selected number of artificial functions 166. Application of training inputs $x_i$ to artificial function 166 may result in generation of artificial data 220. Artificial data 220 may include one or more sets of paired data, denoted by ($x_i$,$h_j(x_i)$), where i corresponds to a point of training data 160 and j corresponds to a selected artificial function. The number of sets of paired data may be equivalent to the number of selected artificial functions 166. The number of points in each set of artificial data 220 may be equal to the number of points in training data 160. For example, training data 160 may include one hundred points (e.g., i=1, 2, ... 100, and ($x_i$, $y_i$)=($x_1$, $y_1$), ($x_2$, $y_2$), ... ($x_{100}$, $y_{100}$)). Processing module 110 may select ten sets of parameters in order to select ten artificial functions 166. Target function generation module 130 may generate ten sets of artificial data 220 based on the ten corresponding artificial functions, such that each set among the ten sets of artificial data 220 may include one hundred points.

After generation of artificial data 220, generation of target function 168 may continue from operation 211 to operation 212. At operation 212, target function generation module 130 may send training data 160 and artificial data 220 to arithmetic module 140. Arithmetic module 140 may determine a training mean 240, which may be a mean of training data 160. Arithmetic module 140 may further determine a training standard deviation 242, which may be a standard deviation of training data 160. Arithmetic module 140 may further determine a number of artificial mean 250 (denoted as $m_j$), where each artificial mean may be a mean of a particular set of artificial data 220. For example, an artificial mean $m_1$ may be an artificial mean of the set of artificial data 220 at j=1. Arithmetic module 140 may further determine a number of artificial standard deviation 252 (denoted as $d_j$), where each artificial standard deviation may be a standard deviation of a particular set of artificial data 220. For example, an artificial standard deviation $d_1$ may be a standard deviation of the set of artificial data 220 at j=1. Arithmetic module 140 may send training mean 240, training standard deviation 242, artificial mean 250, and artificial standard deviation 252 to target function generation module 130. In some examples, where arithmetic module 140 may be a component of target function generation module 130, target function generation module 130 may determine training mean 240, training standard deviation 242, artificial mean 250, and artificial standard deviation 252.

After generation of training mean 240, training standard deviation 242, artificial mean 250, and artificial standard deviation 252, generation of target function 168 may continue from operation 212 to operation 213. At operation 213, target function generation module may generate a number of target functions 168 based on artificial data 220, training mean 240, training standard deviation 242, artificial mean 250, and artificial standard deviation 252. The number of target functions 168 may be equivalent to the number of selected artificial functions 166 or the number of sets in artificial data 220. For example, a target function $f_2$ may be based on artificial function $h_2$, or a set of artificial data 220 at j=2. A target function $f_2$ may be generated based on artificial data 220 at j=2, training mean 240, training standard deviation 242, an artificial mean 250 $m_2$, and an artificial standard deviation 252 $d_2$.

In some examples, target function generation module 130 may generate the number of target functions 168 by applying a sign function to training mean 240, training standard deviation 242, artificial mean 250, and artificial standard deviation 252. In some examples, target function generation module 130 may generate target function 168 by applying a round function to training mean 240, training standard deviation 242, artificial mean 250, and artificial standard deviation 252. In some examples, target function generation module 130 may generate target function 168 by applying a nearest number function to training mean 240, training standard deviation 242, artificial mean 250, and artificial standard deviation 252. Target function generation module 130 may generate target function 168 by applying various other functions, which may be selected based on machine learning instructions 122, to training mean 240, training standard deviation 242, artificial mean 250, and artificial standard deviation 252. In some examples, target function 168 may be further based on a noise parameter such as a Gaussian noise.

After generation of target function 168, target function generation module 130 may generate target data 230 and weighted target data 232. At operation 214, target function generation module 130 may apply training inputs $x_i$ of training data 160 to each target function 168 to generate target data 230. Target data 230 may include one or more sets of paired data, denoted by $(x_i, f_j(x_i))$, where the number of sets of paired data in target data 230 may be equivalent to the number of target functions 168. The number of points in each set of target data 230 may be equal to the number of points in training data 160. For example, if target generation function module 130 generated ten target functions 168, then there are ten sets of target data in target data 230. After generation of target data 230, at operation 215, processing module 110 may apply set of weights 170 to training data 160 to generate weighted target data 232. Weighted target data 232 may include one or more sets of paired data, denoted by $(x_i, f_{wj}(x_i))$, where the number of sets of paired data in weighted target data 232 may be equivalent to the number of target functions 168. The number of points in each set of weighted target data 232 may be equal to the number of points in training data 160.

After generation of target data 230 and weighted target data 232, machine learning module 120 may determine a number of artificial learned functions 164 and may determine a number of artificial weighted functions 174. Machine learning module 120 may determine a particular artificial learned function 164 based on a particular target data 230. For example, machine learning module 120 may determine an artificial learned function $g_2$ based on target data $(x_i, f_2(x_i))$ at set j=2. The number of artificial learned functions 164 may be equivalent to the number of sets of target data in target data 230. Machine learning module 120 may further determine a particular artificial weighted function 174 based on a particular weighted target data 232. The number of artificial weighted functions 174 may be equivalent to the number of sets of weighted target data in weighted target data 232.

Figure 3:
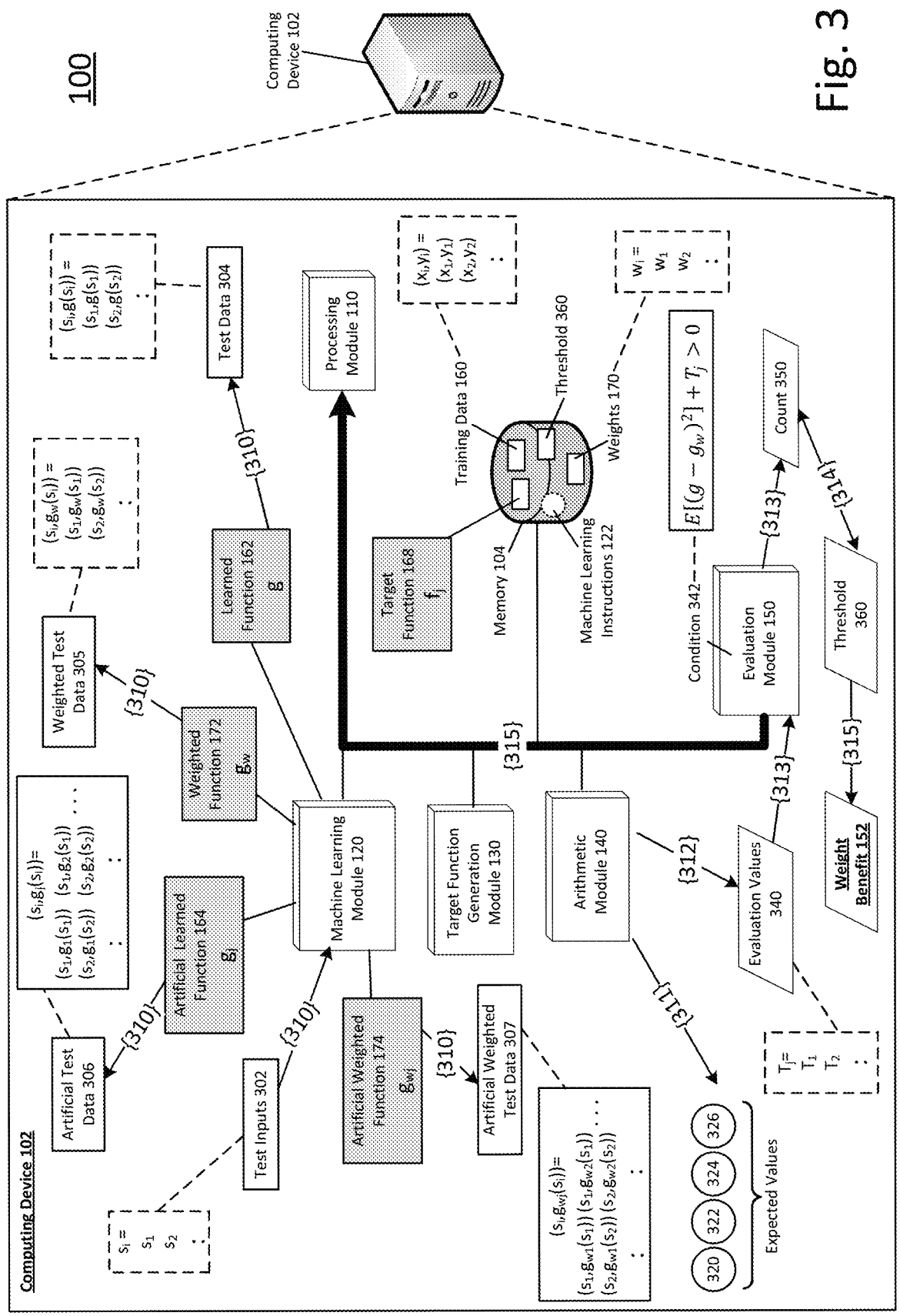
FIG. 3 illustrates the example system of FIG. 1 with additional detail relating to determination of a weight benefit.

FIG. 3 illustrates example system 100 of FIG. 1 with additional detail relating to determination of the weight benefit, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

As will be described in more detail below, machine learning module 120 may apply a set of test inputs 302 to learned function 162, weighted function 172, one or more artificial learned function 164, and one or more artificial weighted function 174 (operation {310}). As a result of the application, machine learning module 120 may generate test data 304, weighted test data 305, artificial test data 306, and artificial weighted test data 307 (operation {310}). Arithmetic module 140 may determine evaluation values 340 based on test data 304, weighted test data 305, artificial test data 306, and artificial weighted test data 307 (operations {311, 312}). Evaluation module 150 may generate weight benefit 152 based on evaluation values 340 (operations {313, 314, 315}).

At operation 310, machine learning module 120 may apply test inputs 302 to learned function 162 to generate test data 304. Test inputs 302 may be a set of vectors (denoted as $s_i$) and may be received from a device outside of system 100. Test data 304 may be associated with a set of paired data (denoted as $(s_i, g(s_i))$ including test inputs 302 $s_i$ and generated test labels $g(s_i)$. Learned function 162 may be effective to define a relationship between test inputs 302 and generated test labels $g(s_i)$. Machine learning module 120 may further apply test inputs 302 to weighted function 172 to generate weighted test data 305. Weighted test data 305 may be associated with a set of paired data (denoted as $(s_i, g_w(s_i))$ including test inputs 302 $s_i$ and generated weighted test labels $g_w(s_i)$. Weighted function 172 may be effective to define a relationship between test inputs 302 and weighted test labels $g_w(s_i)$.

Machine learning module 120 may further apply test inputs 302 to each artificial learned function $g_j$ among artificial learned function 164 to generate one or more sets of artificial test data 306 (denoted as $(s_i, g_j(s_i))$). Each set of artificial test data 306 may be associated with a set of paired data including test inputs 302 $s_i$ and a corresponding artificial test labels $g_j(s_i)$. For example, machine learning module 120 may apply test input 302 to an artificial learned function $g_2$ to generate a set of artificial test data $(s_i, g_2(s_i))$. Artificial learned function 164 may be effective to define a relationship between test inputs 302 and artificial test labels $g_j(s_i)$. Machine learning module 120 may further apply test inputs 302 to each artificial weighted function among artificial weighted function 174 to generate artificial weighted test data 307 (denoted as $(s_i, g_{wj}(s_i))$). Each set of artificial weighted test data 307 may be associated with a set of paired data including testing inputs 302 $s_i$ and a corresponding artificial weighted test labels $g_{wj}(s_i)$. Artificial weighted function 174 may be effective to define a relationship between test inputs 302 and artificial weighted test labels $g_{wj}(s_i)$.

At operation 311, arithmetic module 140 may determine an expected value 320 between learned function 162 and weighted function 172. An example of expected value 320 between learned function 162 and weighted function 172 may be:

$$E[(g-g_w)^2]$$

where g denotes learned function 162 and $g_w$ denotes weighted function 172.

In an example, arithmetic module 140 may determine expected value 320 with use of test inputs 302, such as:

$$E[g(s_i)-g_w(s_i)^2]$$

where $s_i$ is test inputs 302, $g(s_i)$ is test labels $t_i$, and $g_w(s_i)$ is weighted test labels $t_{wi}$.

Similarly, arithmetic module 140 may further determine an expected value 322 between each $j^{th}$ artificial learned function 164 and each $j^{th}$ target function 168. Arithmetic module 140 may further determine an expected value 324 between each $j^{th}$ artificial weighted function 174 and each $j^{th}$ target function 168. Arithmetic module 140 may further determine an expected value 326 between each $j^{th}$ artificial learned function 164 and each $j^{th}$ artificial weighted function 174. Arithmetic module 140 may determine expected values 322, 324, 326 with use of test inputs 302.

At operation 312, arithmetic module 140 may determine a number of evaluation values 340 (denoted as $T_j$). Evaluation values 340 may be based on expected values 322, 324, 326, such as:

$$T_j = E[(g_j-f_j)^2] - E[(g_{wj}-f_j)^2] - E[(g_j-g_{wj})^2]$$

where $E[g_j-f_j)^2]$ denotes expected value 322, $E[g_{wj}-f_j)^2]$ denotes expected value 324, and $E[g_j-g_{wj})^2]$ denotes expected value 326.

At operation 313, evaluation module 150 may compare each value among evaluation values 340 with expected value 320. An example comparison of evaluation values 340 with expected value 320 may be based on a condition 342:

$$E[(g-g_w)^2] + T_j > 0$$

Evaluation module 150 may determine a count 350 by counting how many values among evaluation values 340 meets condition 342. For example, if thirty seven values among evaluation values 340 meet condition 342, then count 350 will be of a value "37". At operation 314, evaluation module 150 may compare count 350 with a threshold 360, where threshold 360 may be defined by machine learning instructions 122 and may be stored in memory 104. In an example, threshold 360 may be half of the number of points of training data 160. For example, when training data 160 includes one hundred points, threshold 360 may be of a value "50".

At operation 315, evaluation module 150 may determine weight benefit 152 based on the comparison of count 350 and threshold 360. Evaluation module 150 may assign a value to weight benefit 152 based on the comparison of count 350 and threshold 360. In an example, when count 350 is "37" and threshold is "50", evaluation module 150 may assigned to a value of "1", or "A" ("apply") to weight benefit 152. Similarly, when count 350 is "71" and threshold is "50", evaluation module 150 may assigned to a value of "0", or "not A" ("do not apply") to weight benefit 152. Evaluation module 150 may send weight benefit 152 to processing module 110. Processing module 110, based on the value of weight benefit 152, may determine whether to apply weights 170 to training data 160. Processing module 110, based on the value of weight benefit 152, may further instruct machine learning module 120 whether to deploy learned function 162 or weighted function 172.

Among other possible benefits, a system in accordance with the disclosure may improve a performance of a machine learning system. In some examples, a weighted function determined from weighted training data may be considered as more accurate than a function determined from an unweighted training data. However, weighted training data may result in sample loss and may unintentionally hurt the generation of the weighted function. A system in accordance with the disclosure may provide a method to determine whether application of weights to training data may benefit or hurt the performance of the machine learning system.

Figure 4:
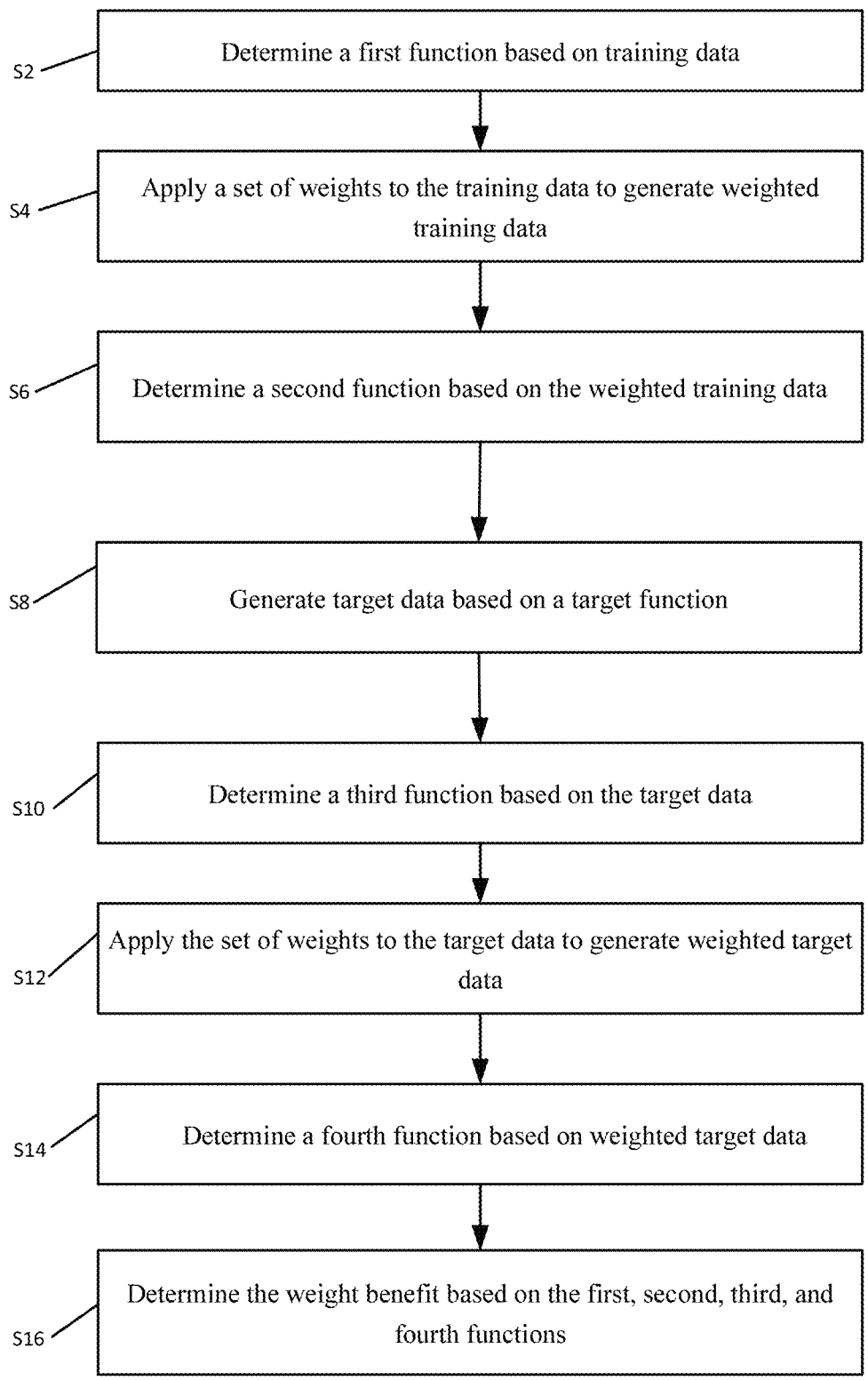
FIG. 4 illustrates a flow diagram for an example process to implement a weight benefit evaluator for training data.

FIG. 4 illustrates a flow diagram for an example process to implement a weight benefit evaluator for training data, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, S10, S12, S14, and/or S16. Although illustrated as discrete blocks, various blocks may be divided into additional blocks, combined into fewer blocks, or eliminated, depending on the desired implementation.

Processing may begin at block S2, "Determine a first function based on training data". At block S2, a device may determine a first function based on training data. The training data may include training inputs and training labels.

Processing may continue from block S2 to block S4, "Apply a set of weights to the training data to generate weighted training data". At block S4, the device may apply a set of weights to the training data to generate weighted training data.

Processing may continue from block S4 to block S6, "Determine a second function based on the weighted training data". At block S6, the device may determine a second function based on the weighted training data.

Processing may continue from block S6 to block S8, "Generate target data based on a target function". At block S8, the device may generate target data based on a target function. The target function may include target labels different from the training labels. The device may generate the target function. In an example, the device may determine a set of parameters to generate an artificial function. The device may further generate artificial data with use of the training inputs and the artificial function. The artificial data may include the training inputs and artificial labels. The device may further determine a first mean associated with the training data. The device may further determine a first standard deviation associated with the training data. The device may further determine a second mean associated with the artificial data. The device may further determine a second standard deviation associated with the artificial data. The device may further generate the target function based on the first mean, the first standard deviation, the second mean, and the second deviation. In some examples, the target function may be based on a noise parameter.

Processing may continue from block S8 to block S10, "Determine a third function based on the target data". At block S10, the device may determine a third function based on the target data.

Processing may continue from block S10 to block S12, "Apply the set of weights to the target data to generate weighted target data". At block S12, the device may apply the set of weights to the target data to generate weighted target data.

Processing may continue from block S12 to block S14, "Determine a fourth function based on weighted target data". At block S14, the device may determine a fourth function based on weighted target data.

Processing may continue from block S14 to block S16, "Determine the weight benefit based on the first, second, third, and fourth functions". At block S16, the device may determine the weight benefit based on the first, second, third, and fourth function. The weight benefit may be associated with a benefit to apply the set of weights to the training data. In some examples, the device may determine a first expected value, a second expected value, a third expected value, and a fourth expected value. The first expected value may be an expected value between the first function and the second function. The second expected value may be an expected value between the third function and the target function. The third expected value may be an expected value between the third function and the target function. The fourth expected value may be an expected value between the third function and the fourth function. The determination of the weight benefit may be based on the first, second, third, and fourth expected values. In some examples, the first, second, third, and fourth expected values may be based on an application of test inputs to the first, second, third, and fourth functions.

In some examples, the device may further determine an evaluation value with used of the second, third, and fourth expected values. The device may further compare the evaluation value with the first expected value. The device may further determine a count based on the comparison of the evaluation value with the first expected value. The device may further compare the count with a threshold. The determination of the weight benefit may be first based on the comparison of the count with the threshold.

FIG. 5 illustrates an example computer program product that can be utilized to implement a weight benefit evaluator for training data, arranged in accordance with at least some embodiments described herein. Program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, computing device 102 may undertake one or more of the blocks shown in FIG. 5 in response to instructions 504 conveyed to the system 100 by medium 502.

In some implementations, signal bearing medium 502 may encompass a computer-readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
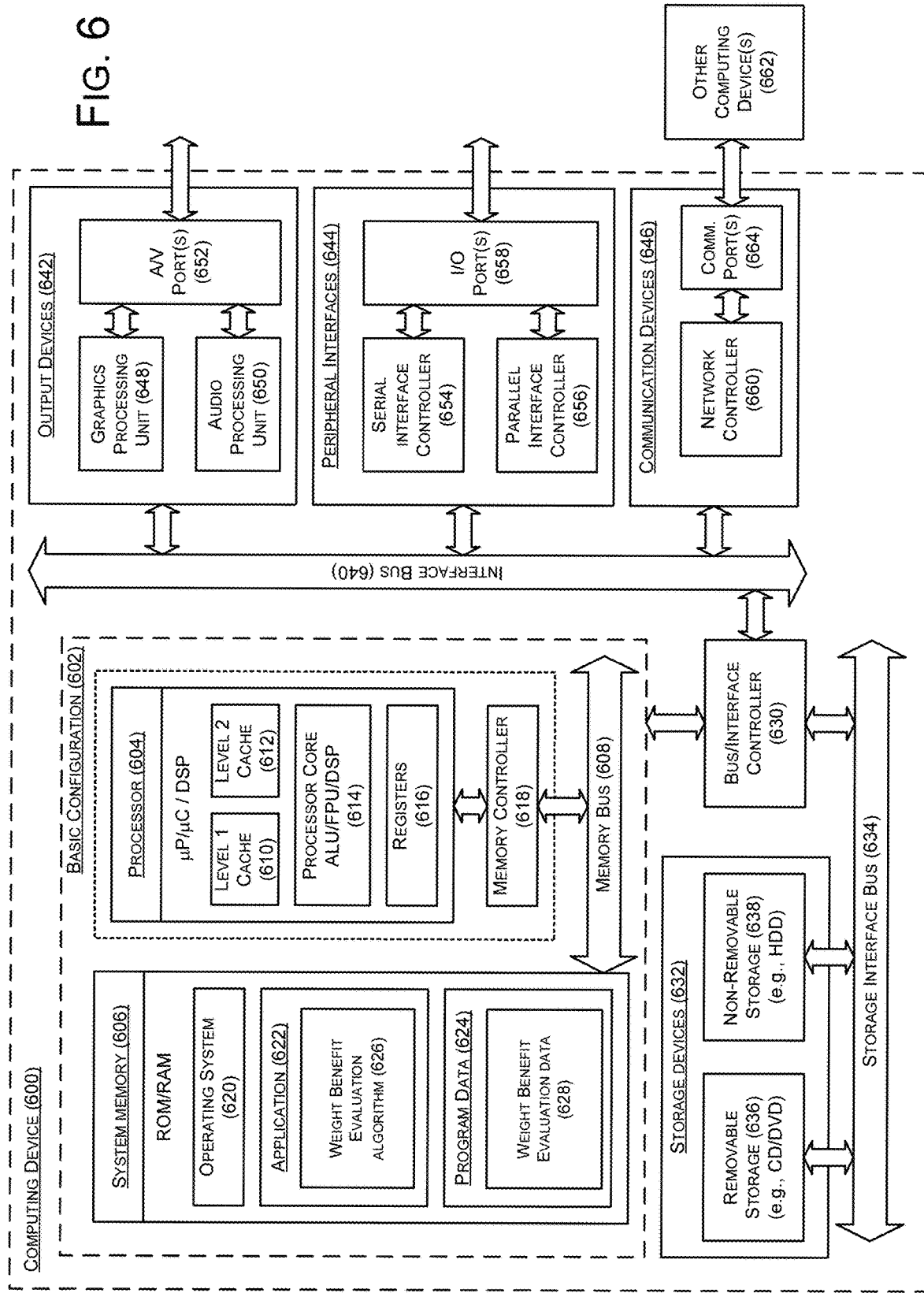
FIG. 6 is a block diagram illustrating an example computing device that is arranged to implement a weight benefit evaluator for training data.

FIG. 6 is a block diagram illustrating an example computing device that is arranged to implement a weight benefit evaluator for training data, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a weight benefit evaluation algorithm 626 that is arranged to perform the functions as described herein including those described with respect to system 100 of FIGS. 1-4. Program data 624 may include weight benefit evaluation data 628 that may be useful for implementation of a weight benefit evaluator for training data as is described herein. In some embodiments, application 622 may be arranged to operate with program data 624 on operating system 620 such that implementations of weight benefit evaluator for training data may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disc (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to improve accuracy of a machine learning system based on a weight benefit value associated with training data, the method comprising:
   determining, by a machine learning module of a device, a first function based on the training data, wherein the training data includes training inputs and training labels;
   applying, by a processing module of the device, a set of weights to the training data to generate weighted training data;
   determining, by the machine learning module of the device, a second function based on the weighted training data;
   generating, by a target function generation module of the device, target data based on a target function, wherein the target data includes target labels different from the training labels;
   determining, by the machine learning module of the device, a third function based on the target data;
   applying, by the processing module of the device, the set of weights to the target data to generate weighted target data;
   determining, by the machine learning module of the device, a fourth function based on the weighted target data;
   determining, by an arithmetic module of the device, a first expected value between the first function and the second function;
   determining, by the arithmetic module of the device, a second expected value between the third function and the target function;
   determining, by the arithmetic module of the device, a third expected value between the fourth function and the target function;
   determining, by the arithmetic module of the device, a fourth expected value between the third function and the fourth function;
   determining, by an evaluation module of the device, an evaluation value with use of the second, third, and fourth expected values;
   determining, by the evaluation module of the device, a count based on a comparison of the evaluation value with the first expected value; and
   comparing, by the evaluation module of the device, the count with a threshold;
   determining, by the evaluation module of the device, the weight benefit value based on the comparison of the count with the threshold, wherein the weight benefit value is associated with application of the set of weights to the training data;
   receiving, at the machine learning system, an input;
   in response to a determination that the count is greater than the threshold, applying, by the processing module of the device, the received input to the first function, wherein the first function is based on the training data without the set of weights applied thereto;
   in response to a determination that the count is less than the threshold, applying, by the processing module of the device, the received input to the second function, wherein the second function is based on the weighted training data; and
   generating, by the machine learning system, a first output, wherein the generation of the first output is based on the applying the received input to the first function, wherein the first output is different than a second output which is generated based on the applying the received input to the second function, wherein the generation of the first output or the second output based on the applying the received input to one of the first function and the second function is effective to benefit a performance of the machine learning system to provide improved accuracy by enabling the machine learning system to use or to refrain from the use of the set of weights depending on whether the use of the set of weights will result in the improved accuracy.

2. The method of claim 1, wherein the first, second, third, and fourth expected values are based on an application of test inputs to the first, second, third, and fourth functions, respectively.

3. The method of claim 1, wherein the generation of the weighted target data is based on the target function.

4. The method of claim 1, further comprising:
   determining, by the target function generation module of the device, a set of parameters to generate an artificial function;
   generating, by the target function generation module of the device, artificial data with use of the training inputs and the artificial function, wherein the artificial data includes the training inputs and artificial labels; and
   generating, by the target function generation module of the device, the target function based on the training data and the artificial data.

5. The method of claim 4, wherein the generation of the target function comprises:
- determining, by the target function generation module of the device, a first mean associated with the training data;
- determining, by the target function generation module of the device, a first standard deviation associated with the training data;
- determining, by the target function generation module of the device, a second mean associated with the artificial data; and
- determining, by the target function generation module of the device, a second standard deviation associated with the artificial data, wherein the target function is based on the first mean, the first standard deviation, the second mean, and the second standard deviation.

6. The method of claim 5, wherein the target function is further based on a noise parameter.

7. The method of claim 5, wherein the target function is based on an application of one of:
- a sign function to the first mean, the first standard deviation, the second mean, and the second standard deviation;
- a round function to the first mean, the first standard deviation, the second mean, and the second standard deviation; or a nearest number function to the first mean, the first standard deviation, the second mean, and the second standard deviation.

8. The method of claim 1, wherein determining the second function includes determining a relationship between weighted training inputs and weighted training labels, and wherein the weighted training inputs are associated with a user profile and the weighted training labels are associated with a movie rating.

9. A machine learning system effective to operate with improved accuracy based on a weight benefit value associated with training data, the machine learning system comprising:
- a memory configured to:
  - store the training data, wherein the training data includes training inputs and training labels; and
  - store a set of weights;
- a target function generation module configured to be in communication with the memory, wherein the target function generation module is configured to:
  - generate target data based on a target function, wherein the target data includes target labels different from the training labels; and
  - store the target data in the memory;
- a processing module configured to be in communication with the target function generation module and the memory, wherein the processing module is configured to:
  - apply the set of weights to the training data to generate weighted training data;
  - apply the set of weights to the target data to generate weighted target data; and
  - store the weighted training data and the weighted target data in the memory;
- a machine learning module configured to be in communication with the target function generation module, the processing module, and the memory, wherein the machine learning module is configured to:
  - determine a first function based on the training data;
  - determine a second function based on the weighted training data;
  - determine a third function based on the target data; and
  - determine a fourth function based on the weighted target data;
- an arithmetic module configured to be in communication with the target function generation module, the processing module, the machine learning module, and the memory, wherein the arithmetic module is configured to:
  - determine a first expected value between the first function and the second function;
  - determine a second expected value between the third function and the target function;
  - determine a third expected value between the fourth function and the target function; and
  - determine a fourth expected value between the third function and the fourth function; and
- an evaluation module configured to be in communication with the target function generation module, the processing module, the machine learning module, the arithmetic module, and the memory, wherein the evaluation module is configured to:
  - receive the first, second, third, and fourth expected values from the arithmetic module;
  - determine an evaluation value with use of the second, third, and fourth expected values;
  - determine a count based on a comparison of the evaluation value with the first expected value;
  - compare the count with a threshold; and
  - determine the weight benefit value based on the comparison of the count with the threshold, wherein the weight benefit value is associated with application of the set of weights to the training data,
- wherein the processing module is further configured to:
  - in response to a determination that the count is greater than the threshold, apply an input, received by the machine learning system, to the first function, wherein the first function is based on the training data without the set of weights applied thereto; and
  - in response to a determination that the count is less than the threshold, apply the received input to the second function, wherein the second function is based on the weighted training data, and
- wherein the machine learning module is further configured to:
  - generate a first output based on the processing module having applied the received input to the first function, wherein the first output is different than a second output which is generated based on the processing module having applied the received input to the second function, wherein the generation of the first output or the second output based on the processing module having applied the received input to one of the first function and the second function is effective to benefit a performance of the machine learning system to provide the improved accuracy.

10. The machine learning system of claim 9, wherein the arithmetic module is further configured to:
retrieve the target function from the memory, wherein the target function is based on the training data.

11. The machine learning system of claim 10, wherein the processing module is configured to generate the weighted target data with use of the target function.

12. The machine learning system of claim 9, wherein the target function generation module is further configured to:
determine a set of parameters to generate an artificial function;

generate artificial data with use of the training inputs and the artificial function, wherein the artificial data includes the training inputs and artificial labels; and generate the target function based on the training data and the artificial data.

13. The machine learning system of claim 12, wherein the target function generation module is further configured to:

determine a first mean associated with the training data;

determine a first standard deviation associated with the training data;

determine a second mean associated with the artificial data; and determine a second standard deviation associated with the artificial data, wherein the target function is based on the first mean, the first standard deviation, the second mean, and the second standard deviation.

14. A method to improve accuracy of a machine learning system based on a weight benefit value associated with training data, the method comprising:

receiving, at a first device from a second device, a first function that is based on the training data, wherein the training data includes training inputs and training labels;

receiving, at the first device from the second device, a set of weights;

receiving, at the first device from the second device, a second function that is based on weighted training data, wherein the weighted training data is based on the set of weights;

generating, by a target function generation module of the first device, target data based on a target function, wherein the target data includes target labels different from the training labels;

determining, by a machine learning module of the first device, a third function based on the target data;

applying, by a processing module of the first device, the set of weights to the target data to generate weighted target data;

determining, by the machine learning module of the first device, a fourth function based on the weighted target data;

determining, by an arithmetic module of the first device, a first expected value between the first function and the second function;

determining, by the arithmetic module of the first device, a second expected value between the third function and the target function;

determining, by the arithmetic module of the first device, a third expected value between the fourth function and the target function;

determining, by the arithmetic module of the first device, a fourth expected value between the third function and the fourth function;

determining, by an evaluation module of the device, an evaluation value with use of the second, third, and fourth expected values;

determining, by the evaluation module of the device, a count based on a comparison of the evaluation value with the first expected value;

comparing, by the evaluation module of the device, the count with a threshold;

determining, by the evaluation module of the first device, the weight benefit value based on the comparison of the count with the threshold, wherein the weight benefit value is associated with application of the set of weights to the training data;

receiving, at the machine learning system, an input;

in response to a determination that the count is greater than the threshold, applying, by the processing module of the device, the received input to the first function, wherein the first function is based on the training data without the set of weights applied thereto;

in response to a determination that the count is less than the threshold, applying, by the processing module of the device, the received input to the second function, wherein the second function is based on the weighted training data; and generating, by the machine learning system, a first output based on the applying the received input to the first function, wherein the first output is different than a second output which is generated by the applying the received input to the second function, wherein the generation of the first output or the second output based on applying the received input to one of the first function and the second function is effective to benefit a performance of the machine learning system to provide improved accuracy by enabling the machine learning system to use or to refrain from the use of the set of weights depending on whether the use of the set of weights will result in the improved accuracy.

15. The method of claim 14, wherein the first, second, third, and fourth expected values are based on an application of test inputs to the first, second, third, and fourth functions, respectively.

16. The method of claim 14, further comprising:

determining, by the target function generation module of the first device, a set of parameters to generate an artificial function;

generating, by the target function generation module of the first device, artificial data with use of the training inputs and the artificial function, wherein the artificial data includes the training inputs and artificial labels;

determining, by the target function generation module of the first device, a first mean associated with the training data;

determining, by the target function generation module of the first device, a first standard deviation associated with the training data;

determining, by the target function generation module of the first device, a second mean associated with the artificial data;

determining, by the target function generation module of the first device, a second standard deviation associated with the artificial data; and generating, by the target function generation module of the first device, the target function with use of the first mean, the first standard deviation, the second mean, and the second standard deviation.

* * * * *